June 28, 1966     A. H. GOREY     3,257,921
BETWEEN-THE-LENS SHUTTER
Original Filed March 3, 1950     9 Sheets-Sheet 1
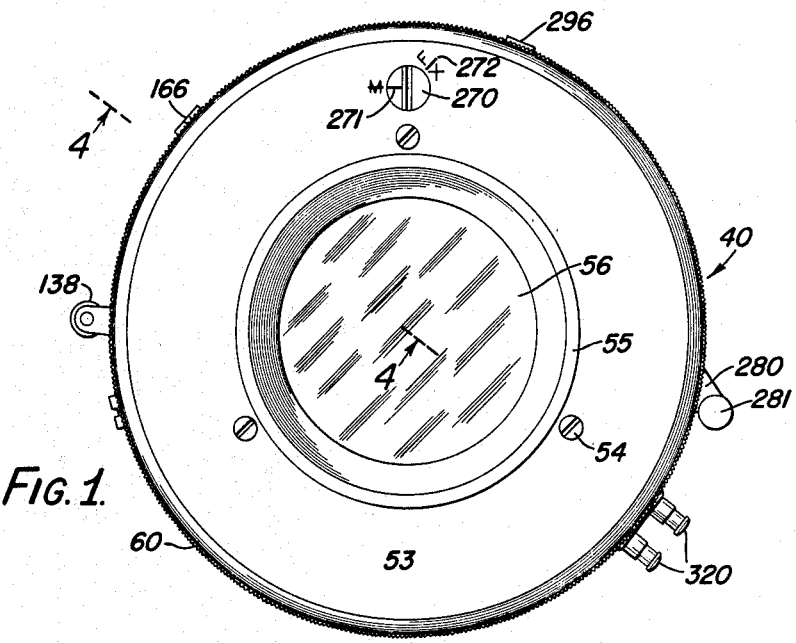
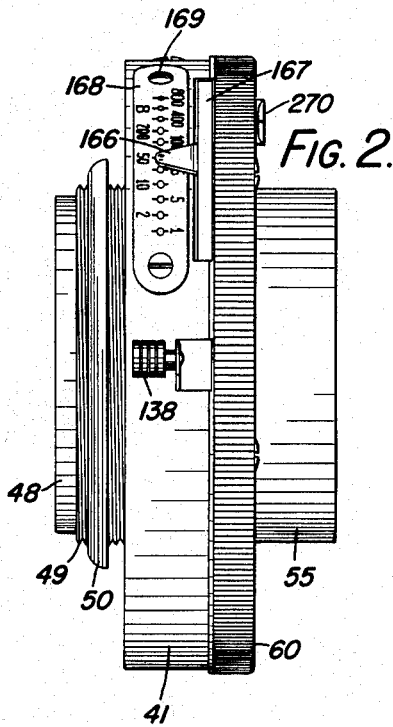
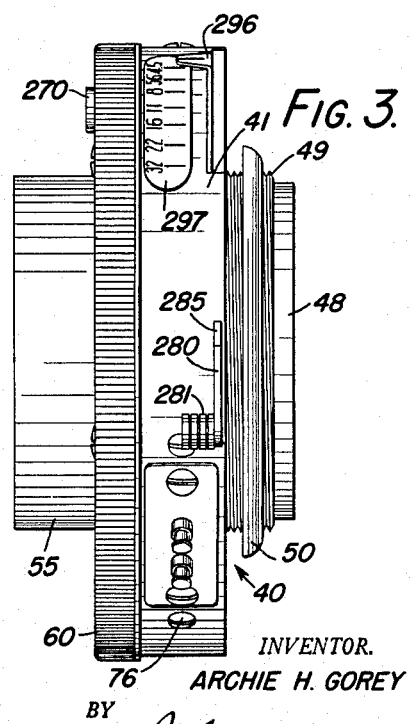
INVENTOR.
ARCHIE H. GOREY
BY
ATTORNEY

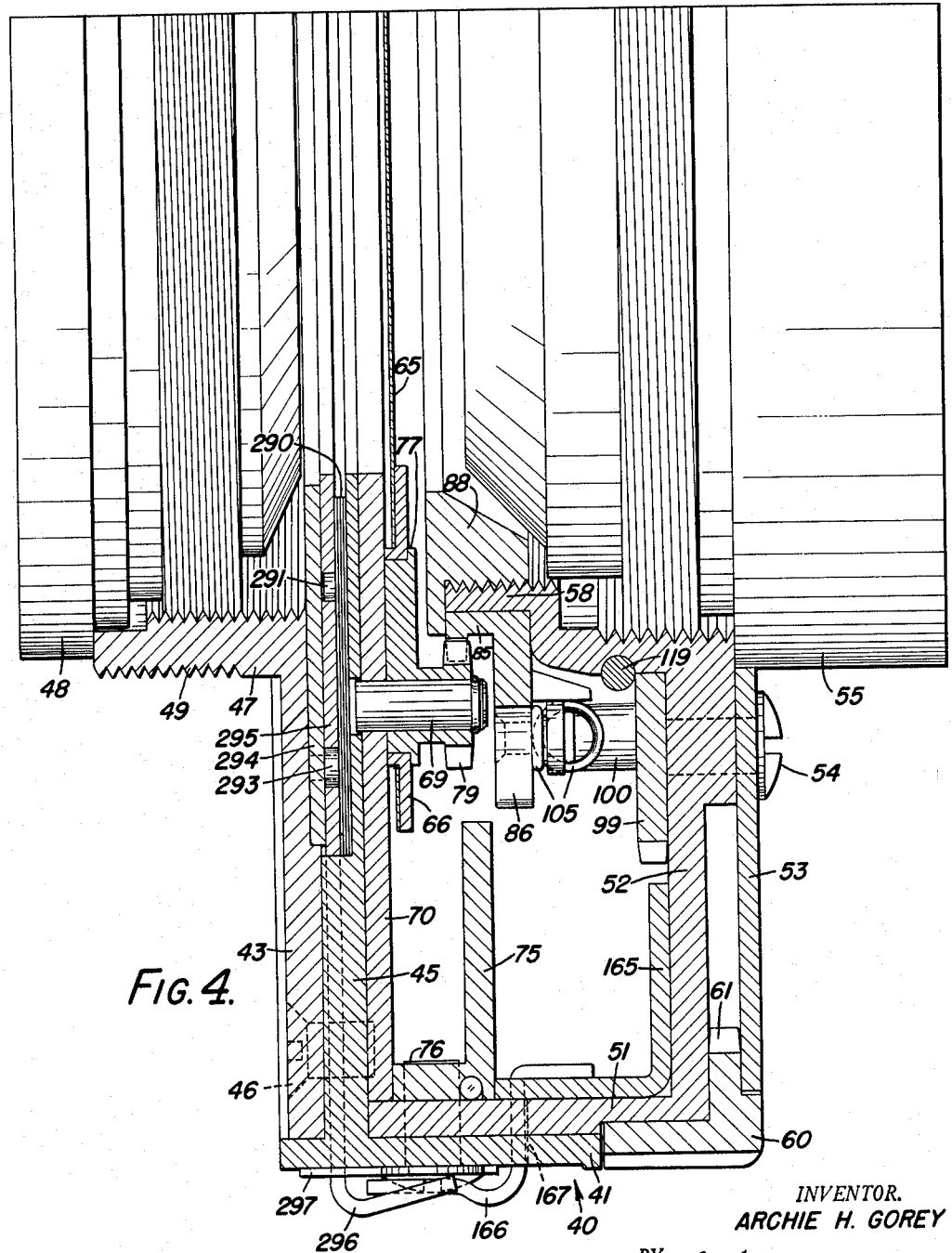

INVENTOR.
ARCHIE H. GOREY
BY
ATTORNEY

June 28, 1966  A. H. GOREY  3,257,921
BETWEEN-THE-LENS SHUTTER
Original Filed March 3, 1950  9 Sheets-Sheet 4

INVENTOR.
ARCHIE H. GOREY
BY
ATTORNEY

June 28, 1966 A. H. GOREY 3,257,921
BETWEEN-THE-LENS SHUTTER
Original Filed March 3, 1950 9 Sheets-Sheet 5

INVENTOR.
ARCHIE H. GOREY
BY
ATTORNEY

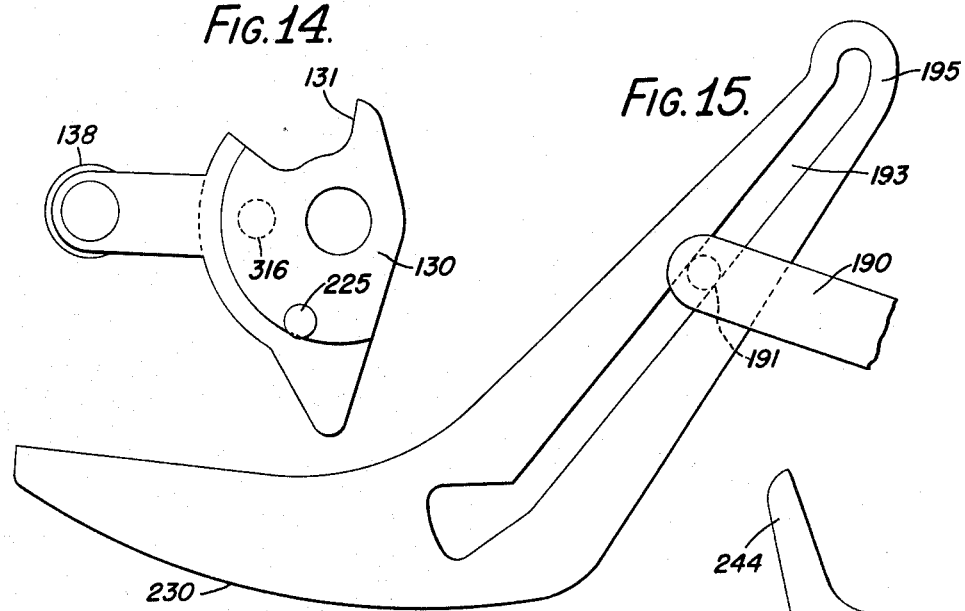

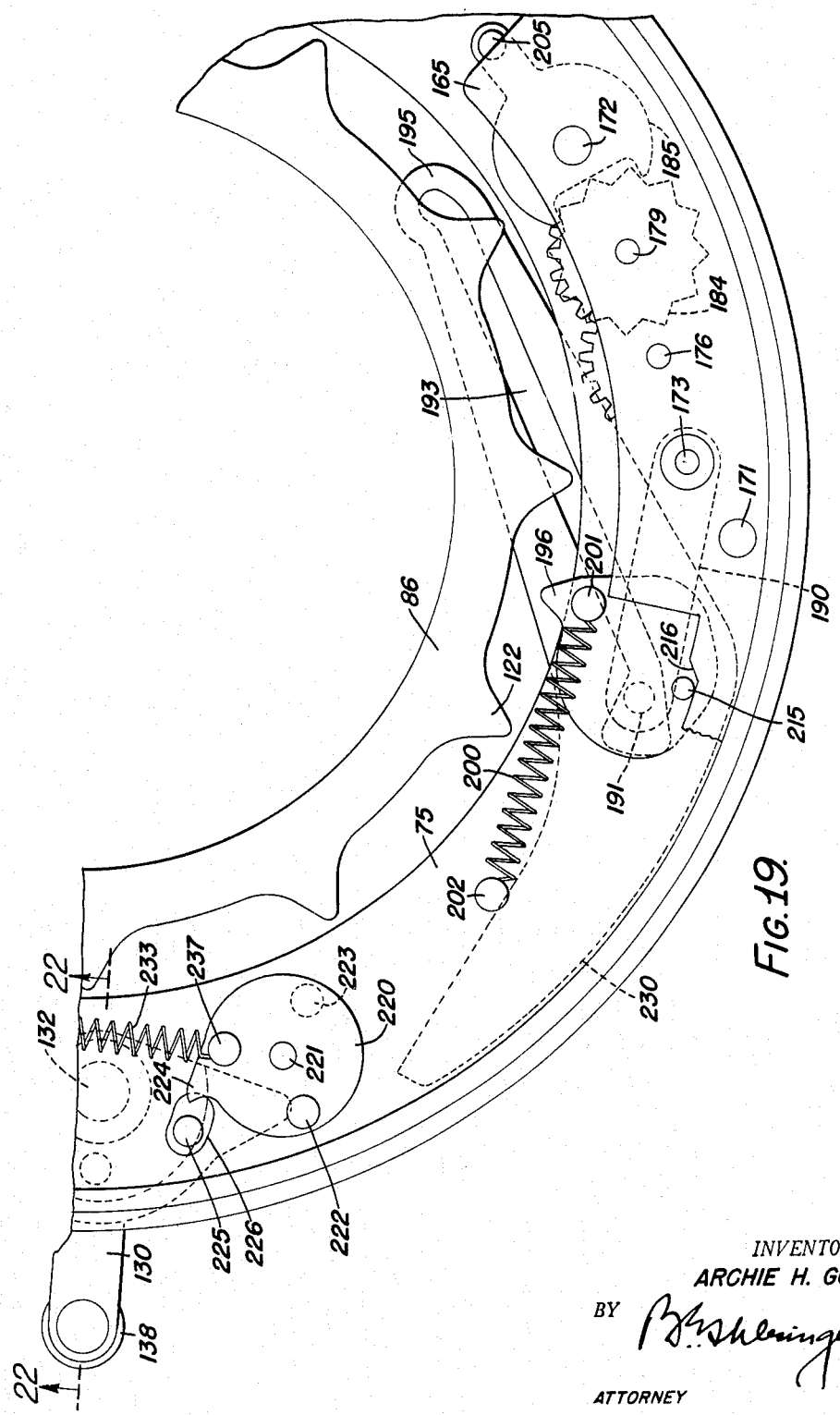

June 28, 1966 A. H. GOREY 3,257,921
BETWEEN-THE-LENS SHUTTER
Original Filed March 3, 1950 9 Sheets-Sheet 9
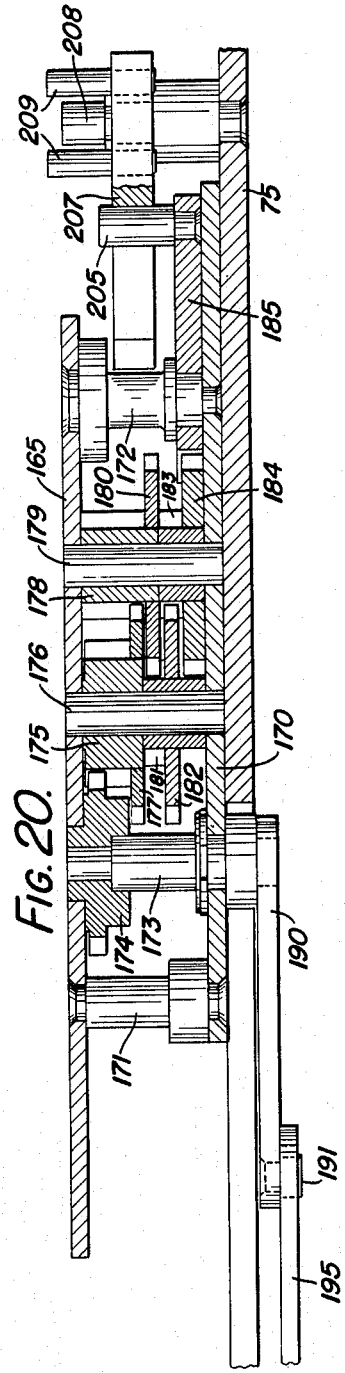
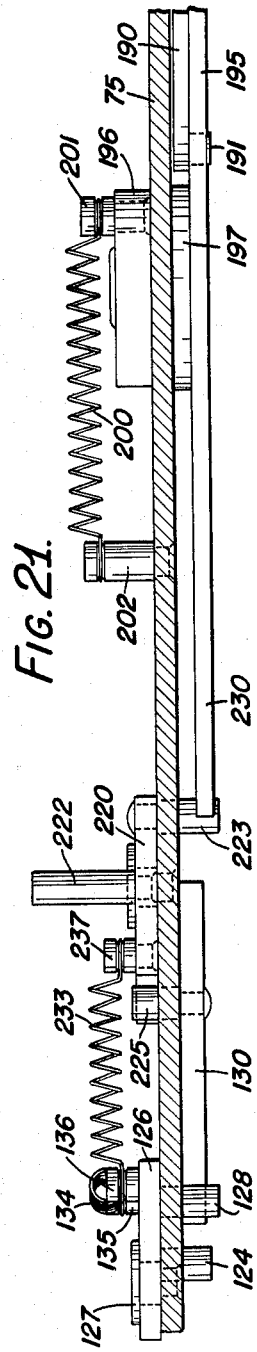
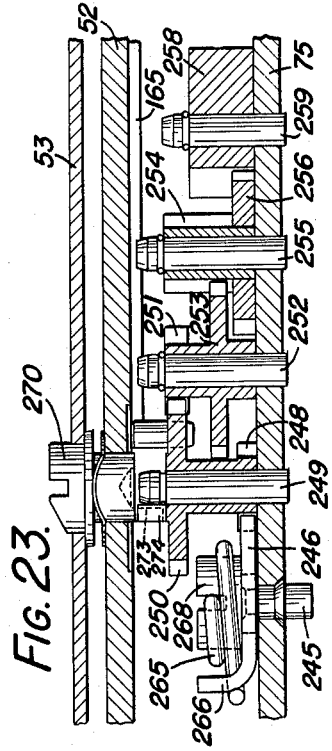
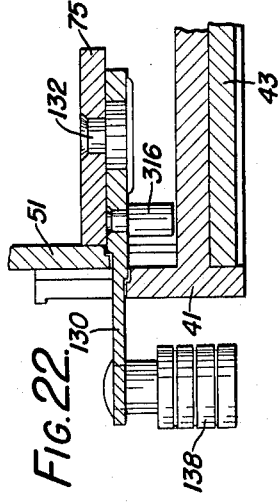
INVENTOR.
ARCHIE H. GOREY
BY
ATTORNEY United States Patent Office 3,257,921
Patented June 28, 1966

3,257,921
BETWEEN-THE-LENS SHUTTER
Archie H. Gorey, Irondequoit, N.Y., assignor to Graflex, Inc., Rochester, N.Y., a corporation of Delaware
Original application Mar. 3, 1950, Ser. No. 147,481, now Patent No. 2,701,992, dated Feb. 15, 1955. Divided and this application Dec. 11, 1952, Ser. No. 325,356
26 Claims. (Cl. 95—11.5)

The present invention relates to shutter mechanism for photographic cameras, and more particularly to a between-the lens shutter. In a still more specific aspect, the invention relates to a between-the-lens shutter of the high-speed type such as disclosed in my pending U.S. patent application, Serial No. 93,712, filed May 17, 1949, now Patent No. 2, 593,873, granted April 22, 1952. This application is a division of my pending U.S. patent application, Serial No. 147,481, filed March 3, 1950, now Patent No. 2,701,992, granted February 15, 1955.

It is desirable in any precision camera to have means provided for adjusting the speed of opening and closing the shutter so as to be able to suit the time that the shutter is open to the light conditions prevailing when a picture is being taken with the camera. At times it is desirable or necessary to use artificial illumination to get a suitable picture.

The wide-variety of flash-lamps available today have presented problems as to synchronizing shutter opening with the flash. Photo-flash lamps of some types have a long peak of maximum illumination. Other lamps, such as the gaseous type, have a very short peak; they are very fast. It is desirable to time the shutter opening to get the peak illumination obtainable with the lamp. Conventional between-the-lens shutters require several flash synchronization settings for lamps, in which the illumination peak endures for a relatively long period of time, some for slower shutter speeds, others for the higher shutter speeds. In all of these conventional shutters, these settings have to be made manually.

One object of the present invention is to provide an improved retarding mechanism for adjusting the shutter speeds or other speeds in a camera.

A further object of the invention is to provide a shutter mechanism in which the flash synchronization mechanism can be adjusted so that the peak of illumination occurs when the shutter is fully open regardless of the shutter speed.

Another object of the invention is to provide a shutter mechanism in which the flash synchronization mechanism is adjustable simultaneously and automatically with the adjustment of shutter speed.

Still another object of the invention is to provide an improved form of contact for the flash mechanism which will be positive in operation, will be essentially free of "bounce," which will therefore have longer life, which will minimize pitting, and which will offer a minimum of resistance to flow of current from the current source to the lamp throughout the whole of its life.

Other objects of the invention will be apparent hereinafter from the specification and from the recital of the appended claims.

In the drawings:

FIG. 1 is a front elevation of a between-the-lens shutter made according to one embodiment of this invention;

FIG. 2 is a side elevation of this between-the-lens shutter looking at the shutter from the left hand side of FIG. 1;

FIG. 3 is a side elevation of the shutter looking from the right hand side of FIG. 1;

FIG. 4 is a fragmentary axial sectional view through the shutter taken substantially on the line 4—4 of FIG. 1 and on a greatly enlarged scale;

FIG. 14 is a detail view, showing the trigger;

FIG. 15 is a detail view, showing the two levers of the timing train, one of them being shown only fragmentarily;

FIG. 16 is a detail view of the combined locking and trip lever associated with the flash synchronizing train;

FIG. 17 is a detail view of the timing ring;

FIG. 19 is still another fragmentary, transverse, sectional view, similar to FIGS. 13 and 14 and showing another portion of the toothed wheel and the parts mounted thereabout;

FIG. 20 is a fragmentary sectional view taken at right angles to FIG. 18 and showing various parts of the timing train adjusted to another position from that shown in FIG. 18;

FIG. 21 is a fragmentary sectional view taken at right angles to FIG. 19 and showing various parts of the timing train when adjusted to position for bulb exposure;

FIG. 22 is a fragmentary sectional view taken on the line 22—22 of FIG. 19 and showing details of the mounting of the trigger lever; and FIG. 23 is a sectional view taken substantially on the line 23—23 of FIG. 13, and showing details of the flash synchronizing mechanism.

Figure 5:
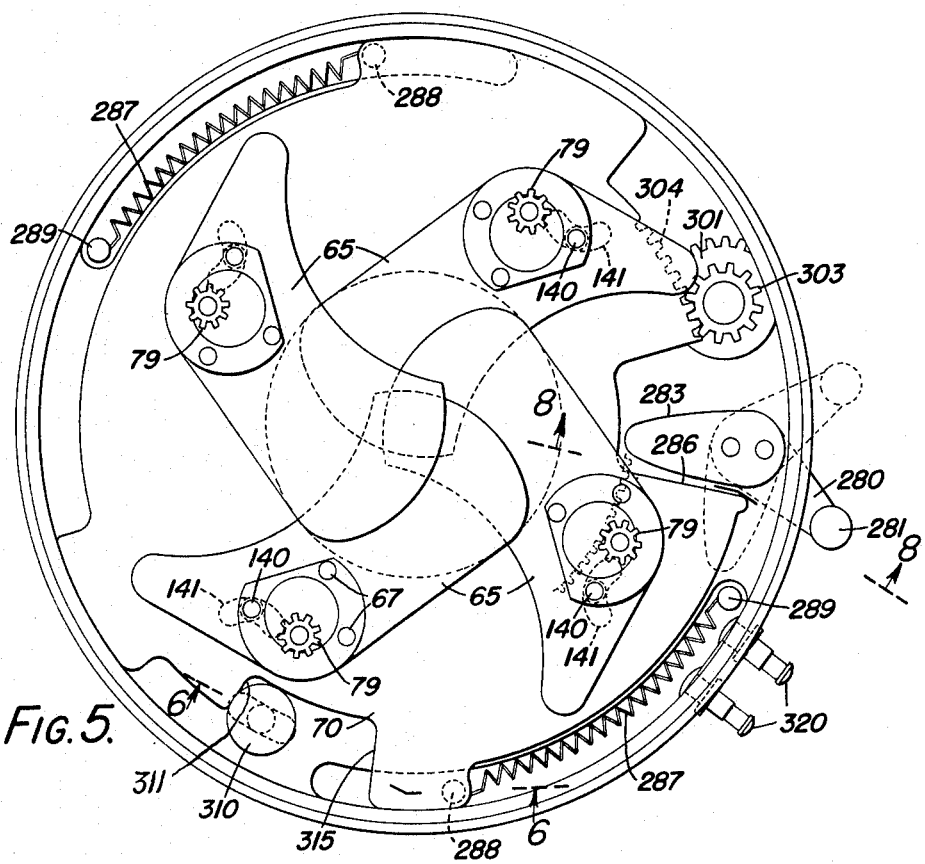
FIG. 5 is a transverse sectional view of the shutter on a smaller scale than FIG. 4, showing the shutter leaves closed and illustrating their mounting and actuating mechanism.

Referring now to the drawings by numerals of reference, 40 denotes the shutter generally. The shutter mechanism is encased within a cylindrical body or housing 41 (FIGS. 1, 2, 3 and 4) that is formed with an internally projecting, circular flange 45. The casing 43 for the back lens element 48 is formed with a flange portion that seats against the flange 45 of housing 41 and that is secured to flange 45 by screws 46. The lens casing 43 is formed with an axially extending, cylindrical flange 47 that is threaded internally to receive the back lens element 48, and that is threaded externally, as denoted at 49, to thread into the lens board (not shown) of the camera. A clamping disc 50 (FIGS. 2 and 3), which threads onto the portion 49 serves to clamp the mounting 40 to the lens board.

Mounted within the casing 41 is the casing 52 for the front lens element 55 of the mounting. The casing 52 is formed with an axially-extending cylindrical portion 51 which fits tightly within the casing 41 and is secured against relative movement thereto, as will be described further hereinafter. The casing 52 is also formed with a cylindrical flange portion 58, which is concentric with and lies radially within flange 51 and which is internally threaded to receive the front lens element 55. Secured to the casing member 52 by screws 54 is a front cover plate 53.

Rotatably mounted on the flange portion 51 of the casing 52 is a wind-up ring 60. This ring has a knurled outer peripheral surface; and it has an internal gear 61 integral with it which projects into the space between the cover plate 53 and the parallel portion of lens casing 52.

Figure 7:
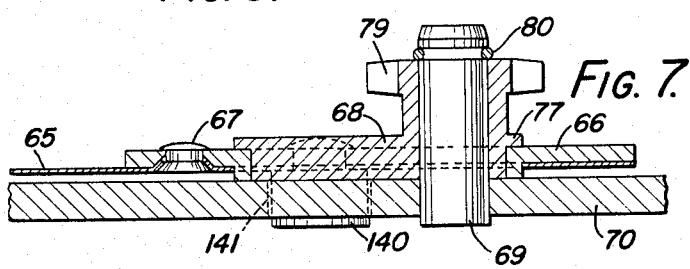
FIG. 7 is a greatly enlarged view showing fragmentarily one of the shutter leaves, its mounting, and its driving mechanism.
Figure 8:
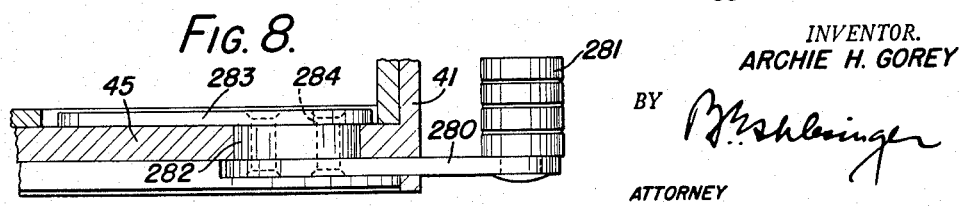
FIG. 8 is a fragmentary sectional view on an enlarged scale taken on the line 8—8 of FIG. 5 and showing the lever for opening the shutters to focusing position.

In the embodiment of the invention shown there are four shutter leaves 65 (FIGS. 4, 5, and 7). These are designed, as shown in FIG. 5, so that they overlap, when in closed position, to prevent passage of light from the forward lens element to the rear lens element and the sensitive medium of the camera. Each shutter leaf 65 is secured to a hub 66 in any suitable manner, as by rivets 67. Each hub fits rotatably on an eccentric member 68 that is journaled on a stud 69 which, in turn, has a pressed fit in a shutter leaf plate 70. The leaf plate 70 is rotatably movable in the casing 52, but is held against axial movement relative to the casing 52 by a mechanism plate 75 that is secured to the casings 41 and 52 by screws 76 (FIG. 4). Each eccentric 68 has a flange 77 for retaining the associated shutter leaf against axial movement, the hub of each shutter leaf being held between the associated flange 77 and the shutter leaf plate 70. Formed integral with each eccentric 68 is a spur pinion 79. A snap ring 80 serves to hold each pinion 79 and its eccentric 68 on its stud 69.

The several pinions 79 mesh with a spur master gear 85 (FIGS. 4 and 12) which is journaled on the hub portion 58 of the casing 52 and which is integral with a toothed ring 86 (FIGS. 4, 12, 13, 18, and 19).

The internal gear 61 (FIGS. 4, 9 and 10) meshes with a spur pinion 90 that is secured to a shaft 91 which is journaled in the lens casing 52. The shaft 91 has integral with it a spur pinion 92 which meshes with a spur gear 93 that is secured to a shaft 94 which is also journaled in casing 52, parallel to shaft 92. The shaft 94 has integral with it a spur pinion 95 that meshes with a spur gear 96 which is secured to a shaft 97 also journaled in casing 52. A spur pinion 98 is integral with the shaft 97. This pinion meshes with a spur gear 99 (FIG. 4) which is journaled on the hub portion 58 of casing 52. This spur gear 99 has two diametrically opposite studs 100 (FIGS. 4 and 12) secured in it. Secured to each stud is one end of a coil spring 105. Each of these coil springs is secured at its opposite end to a stud 106. The two studs 106 are diametrically opposite and are riveted in the toothed portion 86 of master gear 85.

The shutter mechanism of the present invention is designed to be actuated by the springs 105, the springs being wound-up to cock the shutter, and operating, when the shutter mechanism is tripped, to drive the master gear 85 (FIG. 4) and, through the master gear, the pinions 79 (FIG. 7), thus causing the shutter leaves to be opened and then closed, the mechanism operating in this particular like the mechanism of my pending application above mentioned.

The shutter mechanism is wound up by manually rotating the knurled ring 60. Through rotation of the ring 60 the gear train 90, 92, 93, 95, 96, 98 (FIGS. 9, 10 and 11) is driven to cause the gear 99 to be rotated relative to the master gear 85 and stretch the springs 105.

Figure 9:
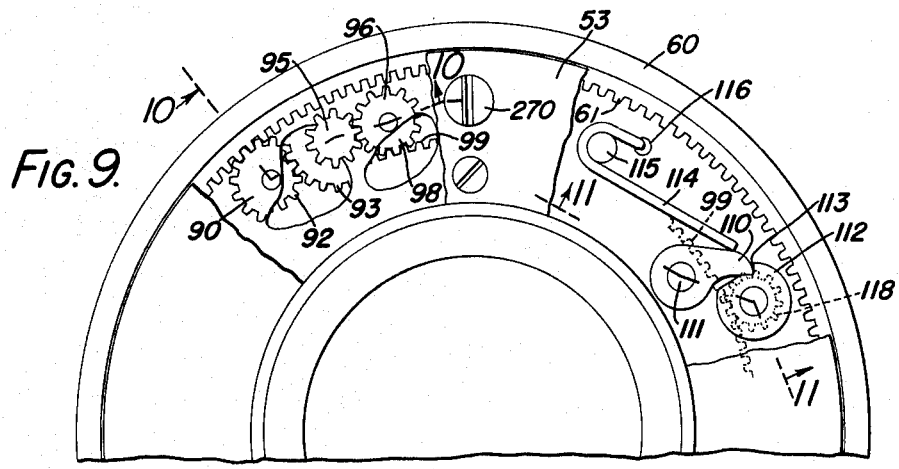
FIG. 9 is a fragmentary end view on an enlarged scale, with parts broken away, showing the gearing of the shutter winding mechanism, and one of the detents for holding the shutter in wound position.
Figure 10:
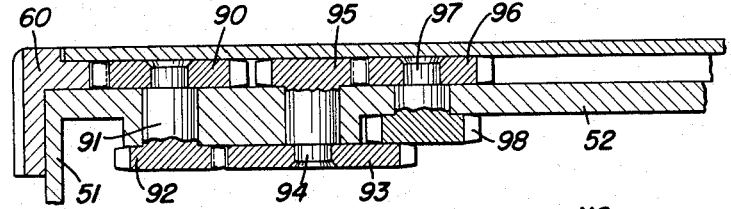
FIG. 10 is a section on the line 10—10 of FIG. 9 on a greatly enlarged scale and looking in the direction of the arrows.
Figure 11:
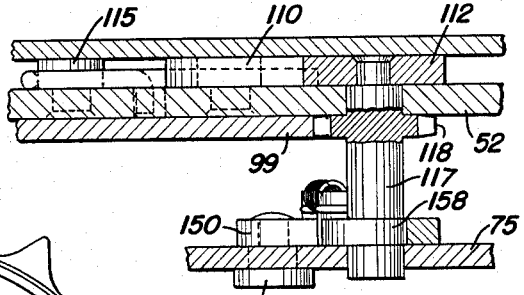
FIG. 11 is a fragmentary sectional view also on an enlarged scale taken generally on the line 11—11 of FIG. 9.

The amount of the winding movement of the gear 99 is limited by stud 100 catching up with stud 106; and the wound gear 99 is prevented from reversing by a stop dog 110 (FIGS. 9 and 11). This dog is pivotally mounted on a stud 111 in the casing 52. This dog is adapted to engage against the shoulder 113 of a cam 112. The dog is held in engagement with the cam by a spring 114 which is coiled about the pin 115 and which has one end engaged in the hole 116 in plate 52 and its opposite end engaged against the back of the dog. Pin 115 is secured in the plate 52.

The cam 112 is secured to a shaft 117 that is journaled in casing 52 and mechanism plate 75. It has a pinion 118 integral with it which meshes with the gear 99. Hence, as the spring gear 99 is rotated to wind the shutter mechanism, the cam 112 is rotated also. When the pinion 118 has made a revolution, then, during winding of the shutter mechanism, the dog 110 will engage the shoulder 113 of the cam 112 and prevent reversing.

The cover plate 53 (FIG. 4) holds the winding ring 60 in place and prevents the spring 114 (FIG. 9) from coming off. The gear 99 is held against the casing 52 by a snap ring 119 (FIG. 4) which engages in a peripheral groove in the cylindrical flange portion 58 of the casing. A nut 88, which threads into the lens casing 58, serves to hold the master gear 85 and toothed plate 86 against a shoulder on the lens casing 58.

The master gear 85 is prevented from rotating with the gear 99 during the winding operation, by engagement of the pin 120 (FIGS. 13 and 16) of lever 121 with one of the teeth 122 of the toothed rim portion 86 of the master gear 85. The lever 121 is pivoted by means of a pin 123 in the mechanism plate 75 (FIG. 4).

Figure 13:
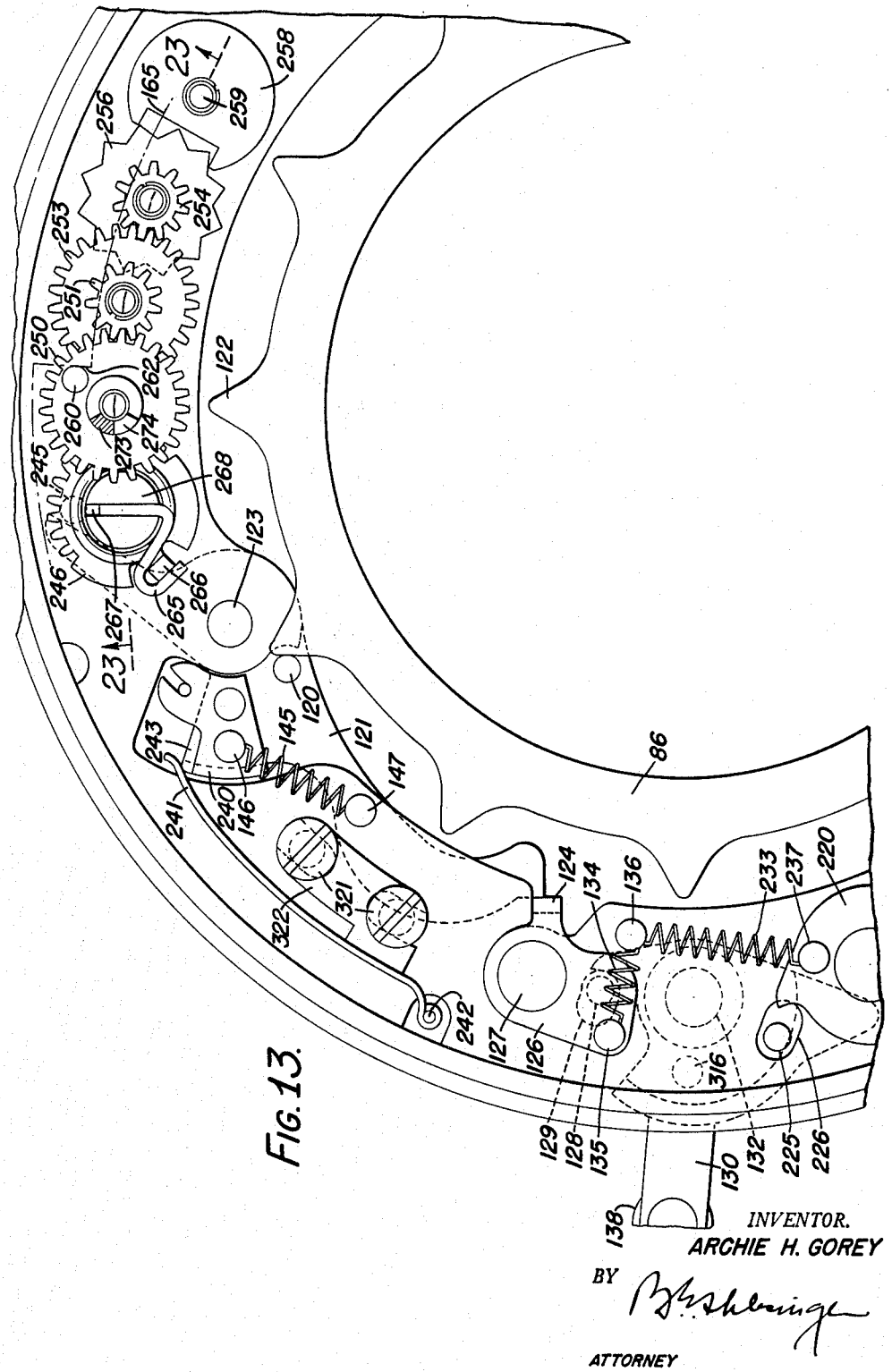
FIG. 13 is a fragmentary, transverse, sectional view on a still further enlarged scale, in a plane parallel to the plane of FIG. 9, and showing the flash synchronizing mechanism and other parts mounted around one section of the toothed wheel.

The lever 121 is held in locking position by lever 126. This lever is formed with a lug 124 (FIGS. 13 and 21) which engages the flattened portion 125 at one end of the lever 121. The lever 126 is pivotally mounted by means of pin 127 on the mechanism plate 75. The lever 126 carries a pin 128. This pin is adapted to extend through a slot 129 in the mechanism plate 75 and to engage the ledge 131 (FIG. 14) of a trigger lever 130 (FIGS. 13 and 14).

The trigger lever 130 is pivoted by means of a pin 132 in the mechanism plate 75. A coil spring 134 which is connected at one end to a pin 135 and at its opposite end to a pin 136, serves to hold the lever 126 in locking engagement with the lever 121. The pin 135 is secured to the lever 126. The pin 136 is secured in the mechanism plate 75.

Figure 12:
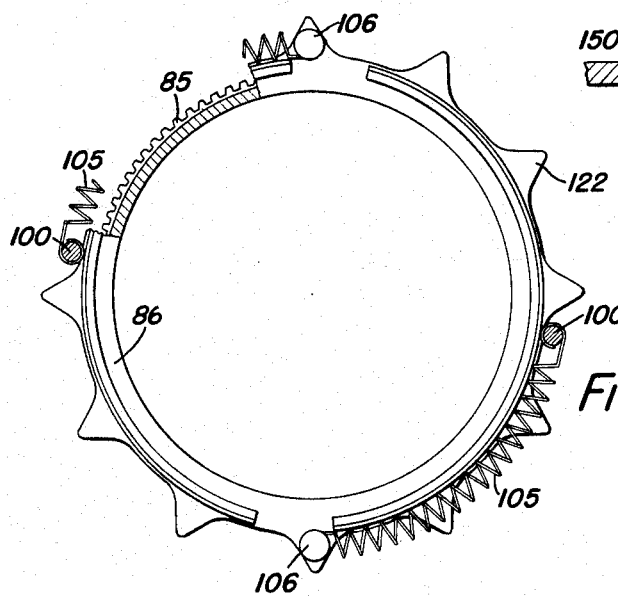
FIG. 12 is a detail view showing the drive gear and the toothed wheel associated therewith, parts being broken away.

Trigger lever 130 is adapted to be tripped manually by movement of the handle 138 which is secured in the lever. When the trigger 130 is moved counterclockwise from the position shown in FIG. 13, the tail 131 of the trigger engages the pin 128 of lever 126 and withdraws the lug 124 of lever 126 from the ledge 125 of lever 121, thereby allowing the toothed member 86 to push past the pin 120, thereby releasing the master gear 85 (FIGS. 4 and 12). The springs 105 then take over and drive the master gear 85, causing the master gear to rotate the pinions 79 (FIGS. 4, 5 and 7).

There is a pin 140 secured to each shutter leaf hub 66 (FIGS. 5 and 7), and each pin 140 engages in an arcuate slot 141 in the shutter leaf plate 70. As the pinions 79 are rotated by the master gear 85, then, each leaf rotates in an oscillating manner due to the throw of its eccentric 68 and the constraining influence of its pin 140 and the associated slot 141. Hence, as the pinions 79 rotate, the shutter leaves, which are closed when the spring plate 99 is wound, are first opened and then closed again. During the time that the shutter leaves are open the sensitive medium in the camera is exposed. The action of the eccentrics 68, pins 140 and slots 141 in the opening and closing of the shutter leaves is the same as in my prior applications above-mentioned and need not further be described here.

Figure 18:
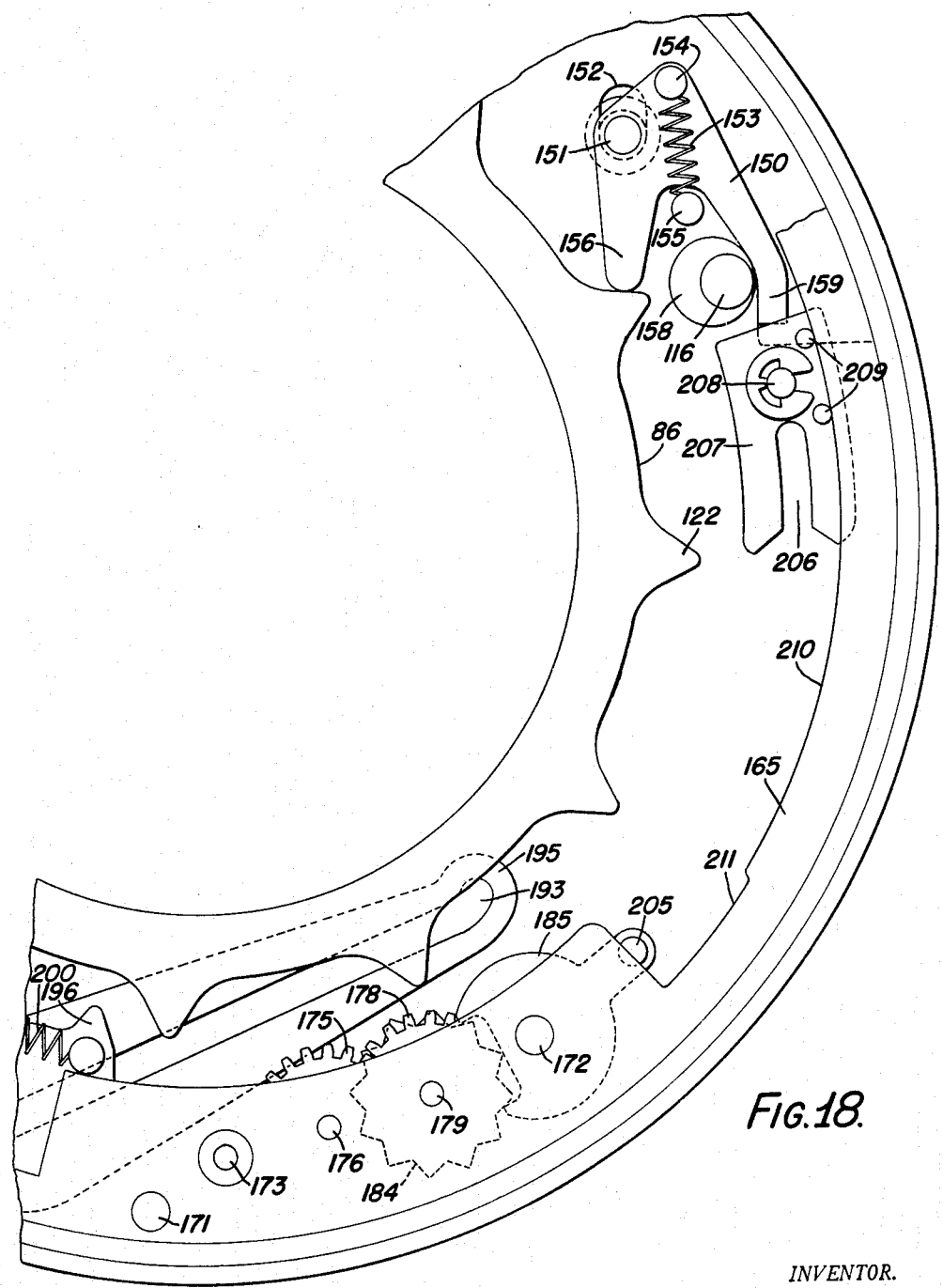
FIG. 18 is another fragmentary, transverse, sectional view, similar to FIG. 13 but showing the timing train and other parts mounted around another portion of the toothed wheel.

The movement of the master gear 85 and toothed plate 86 under actuation of the springs 105 (FIG. 12) is dampened toward the end of the movement, to prevent shock and vibration, by operation of the lever 150 (FIG. 18). This lever carries a pin 151 which engages in a slot 152 in the mechanism plate 75. It is normally held in the position shown in FIG. 18 by a coil spring 153, one end of which is secured to a pin 154 and the other end of which is secured to a pin 155. The pin 154 is fastened to the lever 150. The pin 155 is secured in the mechanism plate 75. The lever 150 has an arm 156 which is held by spring 153 in the path of movement of the toothed plate 86. Just as the shutter leaves 65 close, at the end of a picture taking operation, that is, just before the master gear 85 (FIG. 12) reaches its terminal position under actuation of springs 105, one of the teeth 122 of the toothed plate 86 strikes the lever 150, forcing the lever to move rectilinearly, by reason of engagement of pin 151 with the slot 152, against the resistance of the spring 153. Thus, the force of movement of the master gear is dampened in the last portion of its movement by shoving the lever 150 outwardly against the pull of the spring 153. The lever 150 stops the master gear 85 just short of the position where a tooth 122 of the toothed plate 86 engages again with the pin 120 of the lever 121 (FIGS. 13 and 16). This allows the lever 121 to get into proper position to hold the toothed plate 86 and the master gear 85 against movement when the gear 99 (FIGS. 4 and 10) is rewound again by turning ring 60.

When the shutter is rewound the brake lever 150 (FIG. 18) is moved out of the path of the toothed plate 86 automatically by means of a cam or eccentric 158 (FIGS. 11 and 18). This cam is integral with the pinion shaft 117 and engages the tail 159 of the brake lever 150. The brake lever 150 pivots on the pin 151 in this disengaging movement. The disengagement of the brake lever 150 from the toothed plate 86 permits the toothed plate to move the slight distance required for a tooth 122 of the plate to engage the pin 120 of lever 121 (FIGS. 13 and 16) again so that windup operation of the springs 105 may take place.

As soon as the trigger lever 130 is released, after disengaging lever 121 from toothed plate 86, the spring 134 returns the lever 126 to locking position and simultaneously returns the trigger 130 to cocked position by engagement of the pin 128 with the tail 131 of the trigger (FIG. 14). Simultaneously, the pin 120 of the lever 121 (FIGS. 13 and 14) is returned by coil spring 145 (FIG. 13) to a position to be engageable with a tooth 122 of the toothed plate 86. This spring 145 is connected at one end to a pin 146, which is secured in the lever 120, and is connected at its opposite end to a pin 147 that is fastened in the mechanism plate 75.

For taking pictures, it is desirable that the shutter-operating mechanism be adjustable so that the shutter may be open for longer or shorter periods depending upon the subject and picture-taking conditions. To vary the speed of opening and closing of the shutter, a speed-setting ring 165 (FIGS. 4 and 17) is provided. This ring is mounted between the mechanism plate 75 and the lens casing 52, as shown in FIG. 4. The ring 165 is adapted to be rotated manually to adjust the shutter speed by movement of an index pointer or lever 166 (FIGS. 2 and 4). This pointer or lever is riveted or otherwise secured to the speed-setting ring 165; and it extends through a slot 167 in the casing 41 to read against graduations on a plate 168 (FIG. 2) which is secured by screws 169 to the casing 41.

Mounted in parallelism with the speed-setting ring 165 is a plate 170 (FIG. 20). The two plates are secured in spaced relation by posts 171 and 172. Mounted in the two plates is a shaft 173 (FIGS. 18 and 20) on which there is secured a spur gear 174. This gear meshes with a wide-faced pinion 175 that is journalled on a shaft 176, which is also secured in the plates 165 and 170. Secured to the pinion 175 or integral therewith is a gear 177. This gear meshes with a wide-faced pinion 178 that is journaled on a shaft 179, which is also secured in the two plates 165 and 170. Secured to or integral with the pinion 178 is a gear 180. This meshes with a pinion 181 which is rotatable on the shaft 176. Secured to the pinion 181 is a gear 182. This meshes with a pinion 183 which is rotatable on the shaft 179. Secured to or integral with this pinion is a star wheel 184 that engages an escapement or pallet 185.

The shaft 173 projects through the plate 170 and secured to it is a lever 190 (FIGS. 20, 19, 15 and 21) to the free end to which is riveted a pin 191. The pin 191 engages in a slot 193 of a lever 195 (FIG. 15). This lever is rigidly connected to a dog 196 (FIGS. 19 and 21) which is brazed or otherwise secured to a plate or boss 197 on the lever 195.

The dog 196 is normally held by a spring 200 in position to be engaged by one of the teeth 122 of the toothed plate 86 as the toothed plate rotates under actuation of the springs 105 (FIG. 12) after the trigger has been tripped. The spring 200 is connected at one end with a pin 201 (FIG. 19), which is secured in the dog 196, and at its other end to a pin 202, which is secured in the mechanism plate 75. As the drive gear 85 runs down, the dog 196 is engaged and rocked by one of the teeth 122 of the toothed plate 86. This causes the lever 195 to be swung in an arc which in turn swings the lever 190 in an arc, the latter arc varying in length depending on the position of the pin 191 in the slot 193 of lever 195, that is, on the setting of speed-setting ring 165.

As the lever 190 swings in an arc it rotates the shaft 173 and through the train of gearing 174, 175, 177, 178, 180, 181, 182, 183 (FIG. 20) rotates the star wheel 184 to cause the teeth of the star wheel to engage the pallet or escapement 185, rocking that pallet or escapement about the shaft 172. The pallet operates as in a conventional timing train to apply a braking action, through the gear train 174, 175, 177, 178, 180, 181, 182 and 183, levers 195 and 190, and dog 196, to the toothed member 86 thereby retarding the closing of the shutter leaves. The degree of retardation is varied in accordance with the setting of the timing plate 165. In the mechanism of the present invention, the degree of retardation depends on a combination of difference in travel and load imposed on the timing train by varying the position of the pin 191 in the slot 193. The pallet is the member that resists the turning of the toothed plate 86 which controls the speed of the shutter opening and closing.

The shutter of the invention is so much faster than a conventional shutter that to slow it down requires more swing than would be required with a conventional shutter. For the slowest shutter speeds, then, greater adjustment of the levers 190, 195 or greater reductions in the gear train would be required than could be accommodated in the space available. By compounding the load with the stroke, as is done in the present mechanism, however, the space between the speed settings can be shortened; but even so there is not enough room in the space available to obtained the slow shutter speeds, that may be desired. For this reason in the mechanism of the present invention a second pallet or escapment 207 is provided. To operate this escapement or pallet a pin 205 (FIGS. 18 and 20) is provided. This pin is secured to the pallet 185. When the speed setting ring 165 is adjusted to the right from the position shown in FIGS. 18 and 19 to the position shown in FIG. 20, this pin can be engaged in a slot 206 of the second pallet 207. The second pallet is pivoted on a post 208 which is fixed to the mechanism plate 75. Pins 209 on the pallet 207, center that pallet to facilitate entry of the pin 205 into the slot 206, by riding on a cam surface 210 of the speed setting ring 165. The speed setting ring 165 is cut away, however, as denoted at 211 in FIGS. 17 and 18, so that when the speed setting ring has been adjusted far enough to the right, from the position shown in FIG. 18, for the pin 205 to engage in the slot 206, the pins 209 will be clear of the speed-setting ring and the pallet 207 can oscillate.

In the mechanism shown, there are three possible positions of engagement of the pin 205 in the pallet 207, namely, just at the entrance of the slot 206, midway of the slot 206, and at the extreme right hand end of the slot 206. In the last-named position, the slowest shutter speed is obtained.

In the opening and closing of the shutter, the toothed wheel 86 travels about half a tooth space so that only one tooth 122 of the toothed wheel kicks the dog 196 (FIG. 19) during opening and closing of the shutter. Through the gear reduction of the timing train, however, the pallet 185 or the pallets 185 and 207 may rock back and forth a hundred times or more.

For the highest speed setting of the shutter, the dog 196 (FIG. 19) is adjusted out of the way so that it will not contact with a tooth of toothed member 86 as the master gear runs down. This is achieved by adjusting the timing ring 165 to its extreme position to the left, that is, slightly to the left from the position shown in FIG. 19 so that the pin 215 of dog 196 will ride on the portion 216 of the timing ring. This will cause dog 196 to be rocked out of the way so that it cannot engage toothed member 86. The left hand end of slot 193 of lever 195 is enlarged as shown so that in the extreme left hand position of pin 191 no motion will be transmitted to lever 190.

For a time exposure, that is, for so-called bulb operation, the speed-setting ring 165 is moved to the position shown in FIG. 19. There is a dog 220 (FIGS. 19 and 21) pivotally mounted on the mechanism plate 75. This dog carries pins 222 and 223; and it has a tail 224. The trigger 130 has a pin 225 which projects through a slot 226 in the mechanism plate 75 and which is movable in the normal operation of the trigger into the path of the tail 224 of the dog 220.

In all other speed setting positions of the timing ring 165, except the bulb position, the dog 220 is cammed out of the way of the trigger 130 by engagement of the cam surface 232 (FIG. 17) of the timing ring with the pin 222 of the dog. When the timing ring is adjusted to bulb position, however, the low part 234 of the timing ring is opposite pin 222 and the dog 220 is free to return into intercepting position under actuation of the spring 233. This spring is secured at one end to a pin 237, that is secured to the dog, and at its other end to pin 136 (FIG. 13).

When the timing ring is in bulb position, then, and the trigger 130 is tripped, the toothed plate 86 will rotate, as before, under actuation of springs 105 (FIG. 12) but when a tooth 122 of this plate strikes the dog 196, the tail portion 230 of the lever 195 will be swung around to contact the pin 223 of the dog 220. If the photographer holds the trigger 130 then, the movement of the lever 195 will be stopped because the tail portion 224 of the dog 220 cannot get by the pin 225 of the trigger. The shutter can be held open, then, as long as desired for the time exposure, until the trigger is released. After the trigger is released the tooth 122 can pass the dog 196 and the master gear 85 can complete the closing of the shutter.

In the retarding train above described, retardation is obtained by compounding the stroke and the load. In conventional retarding mechanism for controlling shutter speeds, the members of the train are mounted on stationary axes and variation in speed is obtained by varying the stroke. In the retardation mechanism of the present invention, the members of the train are mounted on the timing ring to be adjustable with that ring and adjustment of the ring also varies the stroke through variation in the relative positions of the two levers. Thus greater variation in shutter speed can be obtained in a reduced amount of space. The use of two pallets further increases the possible variation in shutter speed in a limited amount of space.

For flash-light pictures, it is desirable, as already indicated to time the flash so that its peak synchronizes with the full-opening of the shutter. Since the time of full opening of the shutter varies with the different speed settings of the shutter mechanism, it is desirable, then, that the time of tripping of the flash bulb vary with the speed settings of get optimum flash effect in all the different shutter speeds. This result is achieved with the mechanism of the present invention.

On the lever 121, (FIGS. 13 and 16) there is mounted an electrical contact plate 240 which is insulated from the lever 121 and which is adapted to make contact with an electrical spring contact finger 241 when the lever is swung clockwise about its pivot 123 as viewed in FIG. 13. The finger 241 is secured by a pin 242 to the mechanism plate 75. In the cocked position of the mechanism, shown in FIG. 13, it contacts an insulation block 243 which is also secured to lever 121. Its tension is adjusted by adjustment of a fulcrum block 322, which is adjustably secured to the mechanism plate 75 by screws 321, which pass through slots in the block 322, and which thread into the mechanism plate.

To adjust the flash synchronization, the contact block 240 is so adjusted that it will engage the contact finger 241 before the shutter leaves let any light in the camera at all. For so-called "M" type flash lamps, which have a long peak of illumination, delay of this contact in relation to the opening of the shutter leaves, in order to synchronize full opening of the shutter with the peak of the flash lamps at various shutter speeds, is controlled by a gear train operating through the tail 244 (FIGS. 13 and 16) of the lever 121. The tail of this lever is adapted to engage a pin 245 (FIGS. 13 and 23) which is secured to a gear sector 246. The gear sector meshes with a pinion 248 which is journaled on a post 249 sesured in mechanism plate 75. A gear 250, which is integral with the pinion 248, meshes with a pinion 251 that is journaled on a post 252 also secured in plate 75. The pinion 251 is integral with a gear 253. The gear 253 meshes with a long-faced pinion 254 which is journaled on a post 255 likewise secured in plate 75. To the pinion 254 there is secured a star wheel 256 which drives the pallet or escapement 258. The pallet is journaled on a post 259.

Variation in the delay before tripping of the flash lamp is attained by varying the travel of the sector 246. This is achieved by adjustment of the timing ring 165 and simultaneously with adjustment of the shutter speed. The gear 250 carries a pin 260 which is adapted to abut against the cam surface 262 (FIGS. 13 and 17) of the timing ring so that as the ring is adjusted, the pin 245 on the sector 246 will be adjusted. This will adjust the amount of delay of the lever 121 in releasing gear 85 as contact plate 240 engages the contact finger 241. Thus, the time of closing of the contact 240-241 with reference to the time of opening the shutter can be adjusted. Adjustment of the timing ring for shutter opening, therefore, automatically controls the time of the flash. Heretofore, the flash synchronizing and shutter speed settings have required separate adjustments.

Conventional shutters have had to have two settings for "M" type lamps, one for the faster speeds, and one for the slower speeds. With the mechanism of the present invention, through delay of the shutter opening, different speeds can be achieved in the usual flash peak of the lamp. The time of opening of the shutter is varied relative to the flash so that for different speeds of shutter opening the optimum results are achieved.

For very short duration lamps as, for instance, the type "F" and gaseous discharge type of lamp, the shortest possible delay in the flash prior to the opening of the shutter is desirable. An adjustable button 270 is provided (FIGS. 1 and 23) to throw the delay train 246, 248, 250, 251, 253, 254, 256, 258 into or out of operative position. This button has an index line 271 on it which is set opposite the letter "M" when class "M" type of flash lamp is being used, and which is set opposite the line 272 between "F" and "X" when a high speed type of lamp is being used. This button has a lug 273 (FIGS. 13 and 23) on it, which is adapted to engage a lug 274 on the gear 250. When the button 270 is rotated to the "F–X" position (FIG. 1), the lug 273 will rotate the gear 250 and, through this gear, the pinion 248 and sector 246, to cause the pin 245 to move entirely out of the path of the tail 244 of the lever 121, thereby giving the minimum delay for contact of the contact plate 240 with the finger 241 prior to the opening of the shutter. The sector 246 is rotated against the resistance of a coil spring 265 which engages at one end against the lug 266 bent up from the sector and which at its other end is engaged in a slot 267 in the pin 268 to which the sector is secured.

The switch finger 241 (FIG. 13) and the contact plate 240 are connected by wiring (not shown) to terminal pins 320 (FIGS. 1 and 5) which project from casing 41.

One feature of the invention is the swinging arcuate contact plate 240. With this plate a wiping action is obtained with respect to finger 241 upon movement of lever 121. This wiping action prevents pitting and is self-cleaning.

When the camera, on which the present mounting is employed, is equipped with a range finder or a view finder and these devices are used, the shutter need not be opened for focusing. When critical focusing is required on ground glass, however, both the shutter and the diaphragm leaves, described in detail in my parent Patent No. 2,701,992 above referred to, are opened.

The shutter mechanism of the present invention is so constructed that it can be opened wide for focusing without disturbing the setting or tripping lever or other mechanism.

For opening the shutter for focusing, a lever 280 that is manually operable by means of a handle 281, is provided (FIGS. 1, 3, 5 and 8). This lever extends through a slot 285 in the casing 41 and is secured to a bearing 282 which is journaled in the flange portion 45 of the casing. It has an arm 283 secured to it by means of rivets 284. The arm is adapted to bear against the surface 286 (FIG. 5) of the shutter plate 70. When the lever 280 is rocked from the full line position shown in FIG. 5 to the dotted line position, then, the shutter plate 70 is turned in a clockwise direction against the resistance of the two diametrically opposed springs 287. The springs 287 are each connected at one end to a pin 288 secured in the shutter plate and at their opposite ends to a pin 289 secured in the casing 41.

As the shutter plate 70 moves, it carries with it the shutter leaves 65, causing the pinions 79 (FIGS. 4 and 7) to roll on the master gear 85, which is shown only fragmentarily in FIG. 5, thereby causing the shutter leaves to open fully to focusing position. The lever only shoves the shutter leaf plate 70 approximately half way of its full movement in the cycle of opening and closing of the shutters. The shutter leaves are locked in focusing position by reason of the fact that the lever 280 has passed over dead center. To close the shutters, the lever is returned to original position.

The diaphragm comprises five overlapping leaves 290 (FIG. 4). Each leaf has a pin 291 integral with it which engages in a cam slot of the diaphragm setting ring 295. These cam slots are all alike. Each diaphragm leaf is also pivoted by means of a pin 293 in a plate 294.

The cam plate 295 is rotatably adjustable by movement of the index lever 296 (FIGS. 1 and 3) which extends through a slot in the casing 41 and which registers against a graduated plate 297 that is secured to the outside of the casing. The plate 294, in which the diaphragm leaves are pivoted, is operatively connected to the shutter leaf plate 70 (FIG. 5) through a gear which is provided on the periphery of the plate 294, the pinion 301 which meshes therewith, the pinion 303 which is integral with pinion 301, and the gear segment 304 which is integral with the shutter leaf plate 70. Hence, as the shutter leaf plate 70 is moved by the lever 280 to open the shutter leaves to focusing position (FIG. 5), the diaphragm pivot plate 294 is also rotated, opening the diaphragm leaves wide to focusing position simultaneously with the opening of the shutter leaves to focusing position as described in my Patent No. 2,701,992 (application Serial No. 147,481) above mentioned.

Figure 6:
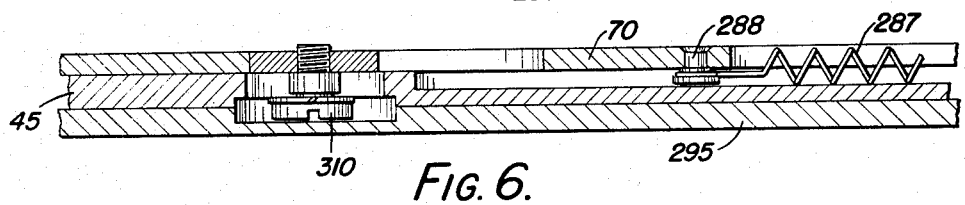
FIG. 6 is an enlarged fragmentary sectional view taken substantially on the line 6—6 of FIG. 5.

The shutter leaf plate 70 and the cam plate 294 are held in open position, after the lever 280 has passed dead center, by the springs 287 (FIG. 5). The shutter leaf plate returns to closed position against a stop 310 (FIGS. 5 and 6) which is secured in the flange 45 of casing 41 and which is adapted to abut against a surface 311 on shutter leaf plate 70.

To prevent tripping of the shutter when the shutter and diaphragm leaves are open for focusing, a cam surface 315 (FIG. 5) is provided on the shutter leaf plate 70. This surface is moved up against the pin 316 (FIGS. 13 and 14) on the trigger lever 130 when the shutter leaf plate is moved to focusing position. Thus, the trigger cannot be tripped as long as the shutter and diaphragm leaves are in focusing position.

While the operation of the shutter mechanism will be apparent from the preceding disclosure it may be briefly summed up here.

The shutter is wound up by manually rotating the ring 60. This stretches the springs 105 (FIG. 12). The amount of movement of the ring is limited by the interference of pins 100 and 106 (FIG. 12) to a distance which will produce a single revolution of cam 112. The master gear 85 is held against movement during the wind-up operation, so that spring 105 may be stretched, by engagement of pin 120 (FIGS. 13 and 16) of lever 121 with a tooth of the toothed rim portion 86 of master gear 85. When the trigger 130 is tripped, the tail 131 (FIG. 14) of the trigger engages pin 128 of a lever 126 (FIG. 13) and swings the latter lever out of engagement with lever 121. The springs 105 (FIG. 12) then drive master gear 85 and its toothed rim 86; and the pin 120 of lever 121 is kicked out of the way. The master gear is driven through a distance not exceeding a pitch of toothed rim 86. During this movement, the pinions 79 (FIG. 5) are rotated to first open and then close the shutter leaves 65.

The shutter speed is adjusted by angular adjustment of speed-setting ring 165 (FIGS. 17, 18 and 19). As the master gear and its toothed rim 86 run down, a tooth of member 86 engages a dog 196 which causes the movement of the member 86 and master gear 85 to be retarded a variable length of time depending on the setting of the speed-setting ring 165. The motion of dog 196 is transmitted through levers 195 and 194 and the cooperating gear train to the escapement or pallet 185, and, if the retarding mechanism is adjusted to one of the three slowest shutter speeds, to a second escapement or pallet 207. The pallet or pallets brake the movement of dog 196 and, through that dog, brake the movement of the toothed rim 86 thereby controlling the time the shutter remains open.

For highest speed the speed-setting ring 165 is adjusted to the left from the position shown in FIG. 19 so that cam portion 216 (FIG. 17) of the setting ring escapes pin 215 (FIG. 19) and swings dog 196 out of the path of the teeth of member 86. For time exposures, the speed-setting ring is adjusted to the position shown in FIG. 19. Then, when the trigger 130 is tripped, pin 225 of the trigger will swing into the path of tail 224 of dog 220 and pin 223 will get in the way of the tail 230 of lever 195 so that when the tooth of member 86 strikes stop dog 196, the lever 195 cannot swing freely out of the way. This stops the movement of toothed rim 86 and master gear 85 so that the shutter is held open as long as the pin 225 of the trigger is held pressed against the tail of dog 220; and the desired time-exposure can be obtained. When the trigger is released, the toothed rim 86 and master gear 85 are free to resume their movement, closing the shutter.

Adjustment of the speed-setting ring 165 for shutter speed simultaneously adjusts the flash synchronization mechanism so that the peak of the illumination of the flash lamp is properly correlated to the time of the shutter opening. The speed-setting ring has a shoulder 262 (FIGS. 13 and 17) which engages a pin 260 on gear 250, so that as the speed-setting ring is adjusted the position of pin 245 of sector 246 is adjusted relative to the tail 244 (FIGS. 13 and 16) of lever 121. This determines the length of time between the tripping of the shutter and the opening of the shutter leaves. When contact portion 240 engages electrical contact finger 241, the circuit to the flash lamp is closed. It is not until the tail 244 of lever 121 strikes pin 245 that the retarding train terminating in the escapement 258 becomes effective. For shortest delay of the flash, the button 270 (FIGS. 1 and 23) is adjusted so that lug 273 will rotate gear 250 and rotate pin 245 out of the path of the tail 244 of lever 121.

The stoppage of the master gear at the end of any picture-taking cycle is dampened by engagement of a tooth of member 86 with brake stop dog 150 (FIG. 18).

While the invention has been described in connection with a particular embodiment thereof, it is capable of further modification. For instance, slots 141 (FIG. 5) might be made straight or of other curvature; slot 193 (FIG. 19) can be made curved; other retarding means than escapement mechanisms may be employed, etc. This application is intended to cover any adaptations, uses, or modifications of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A between-the-lens shutter for photographic cameras comprising a casing, a plurality of shutter leaves movably mounted in said casing, a spring-actuated member for opening and closing the shutter leaves, an adjustable shutter-speed timing device to control the length of time the shutter is open, a photoflash synchronizing mechanism including a pair of normally spaced switch contacts, means for closing said contacts upon actuation of said spring-actuated member, and a timing device for controlling the time of closing of said contacts relative to the opening of said shutter leaves, and a ring rotatably adjustable in said casing and operatively connected to both said timing devices to adjust simultaneously both said timing devices.

2. A between-the-lens shutter for photographic cameras comprising a casing, a plurality of shutter leaves movably mounted in said casing, a movable, spring-actuated master member for opening and closing the shutter leaves, a photoflash synchronizing mechanism including a stationary contact member, a movable contact member, and a retarding mechanism selectively connectable operatively to said movable contact member for controlling the time of engagement of the movable contact member with the stationary contact member in relation to the opening of the shutter leaves, a detent for holding the movable contact member in a cocked position, spring means for moving said movable contact on release of said detent, a shutter-speed timing mechanism comprising a lever adapted to be positioned for actuation by the master member on movement thereof, and a retarding train comprising a second lever having an adjustably slidable pivotal connection with the first lever, and a train of gearing terminating in an escapement and actuatable on movement of the second lever, a ring adjustable rotatably in said casing and having one of said retarding mechanisms mounted thereon and a cam surface for adjusting the other retarding mechanism, a detent for holding the master member against movement, and a trigger movably mounted in the casing for tripping simultaneously both detents.

3. A between-the-lens shutter for photographic cameras comprising a casing, a plurality of shutter leaves movably mounted in said casing, a toothed, spring-actuated, rotatable master member for opening and closing said shutter leaves, a detent lever pivotally mounted in said casing and having an electrical contact member secured thereto, a pin on said lever adapted to engage a tooth of the master member to hold the master member against rotation, a trigger movably mounted in the casing and operable to move the detent lever to disengage said pin from said master member, a stationary electrical contact member secured to said casing with which said first-named contact member is adapted to engage to close a circuit to a photoflash lamp, and means synchronizing the flash with opening of the shutter leaves comprising a train of gearing terminating in an escapement, an actuating member on the first gear of said train which is adapted to be positioned for actuation by said detent lever when the lever is released, and a ring rotatably adjustable in the casing about the axis of the master member and operatively connected to said train of gearing to adjust the position of said actuating member.

4. A between-the-lens shutter for photographic cameras comprising a casing, a plurality of shutter leaves movably mounted in said casing, a toothed, spring-actuated, rotatable master member for opening and closing said shutter leaves, a movable detent adapted to engage a tooth of the master member to hold the master member against rotation, a trigger movably mounted in the casing and operative to disengage said detent, mechanism for controlling the shutter speed comprising a lever positioned to be actuated by the teeth of said master member, a retarding train, and an adjustable member operable by said lever for actuating said retarding train, said last-named member being adjustable to vary simultaneously the load and stroke of said retarding train, mechanism for synchronizing a photoflash with the opening of the shutter comprising two switch contacts, one of which is normally spaced from the other, means operatively connected to said detent to move said switch contacts into engagement upon movement of said detent to disengaged position, and an adjustable member positionable to be actuated by said detent to control the time laps before engagement of said switch contacts after release of said detent, and a ring rotatably adjustable about the axis of said master member for adjusting simultaneously the positions of said two adjustable members to control the time of closing of said switch contacts relative to the opening of said shutter leaves.

5. A between-the-lens shutter for photographic cameras comprising a casing, a plurality of shutter leaves movably mounted in said casing, a toothed, spring-actuated, rotatable master member for opening and closing said shutter leaves, a lever pivotally mounted in said casing and adapted to engage a tooth of the master member to hold the master member against rotation, a trigger movably mounted in the casing and operative to disengage said detent, and synchronizing mechanism for timing a photoflash lamp with the opening of shutter leaves comprising a train of gears terminating in an escapement, the first gear of said train carrying a pin which is adjustable on rotation of said first gear to lie in the path of movement of said lever, means for rotatably adjusting said first gear, a stationary switch contact secured to said casing, and a cooperating switch contact carried by said lever and adapted to engage said stationary switch contact for actuating a photoflash lamp.

6. A between-the-lens shutter for photographic cameras comprising a casing, a plurality of shutter leaves movably mounted in said casing, a toothed, spring-actuated rotatable master member for opening and closing said shutter leaves, a lever pivotally mounted in said casing and adapted to engage a tooth of the master member to hold the master member against rotation, a trigger movably mounted in the casing and operative to disengage said detent, a second lever pivotally mounted in the casing and positioned to be engaged by a tooth of the master member during rotation of the master member, a third lever pivotally connected to the second lever, a retarding gear train terminating in an escapement and actuatable by the third lever, synchronizing mechanism for timing a photoflash lamp with the opening of the shutter leaves comprising a retarding train terminating in an escapement, the first gear of said last-named retarding train carrying a pin which is adjustable on rotation of said first gear to lie in the path of movement of said first-named lever, a ring rotatably adjustable in the casing and having means thereon for rotatably adjusting the pin-carrying gear into or out of the path of movement of said first-named lever in accordance with the time delay characteristic of different flash lamps used on the camera, said first-named retarding train being mounted on said ring, a stationary switch contact, and a second switch contact carried by the first-named lever for engagement with said stationary switch contact for actuating a photoflash lamp.

7. A between-the-lens shutter for photographic cameras comprising a casing, a plurality of shutter leaves movably mounted in said casing, spring-actuated means for opening and closing said shutter leaves, a lever pivotally mounted in said casing for holding said means against movement, a trigger for releasing said lever, means for rocking said lever about its pivot on release of said lever, an electrical contact member secured in said casing and operatively connected to photoflash mechanism, an arcuate electrical contact member carried by said lever and positioned to have wiping engagement with the first-named contact member on movement of said lever about its pivot to close an electrical circuit to said photoflash mechanism, and means adjustable to vary the time-lapse required by said lever before said arcuate contact member comes into engagement with the first-named contact member.

8. A between-the-lens shutter for photographic cameras comprising a casing, a plurality of shutter leaves movably mounted in said casing, spring-actuated means for opening and closing said shutter leaves, a detent movably mounted in said casing for holding said means against movement, a trigger for releasing said detent, means including said spring-actuated means for moving said detent on release thereof, shutter-speed timing mechanism selectively positionable to control the length of time the shutter is opened, and electric switch positioned to be engaged and closed on movement of said detent, after release thereof, for closing an electrical circuit to a photoflash lamp, means adjustable to vary the time delay in the movement of said detent after release before closing of said switch, and a member adjustably mounted in said casing for adjusting simultaneously the last-named means and said shutter-speed timing mechanism, whereby to adjust the time of closing said electric circuit relative to the opening of said shutter leaves.

9. A between-the-lens shutter for a photographic camera comprising a casing, a plurality of shutter leaves, means for opening and closing the shutter leaves, adjustable retarding means operatively connected to said opening and closing means for controlling the length of time the shutter is open, a photoflash synchronizer mechanism including a switch arranged to be closed by a part of said opening and closing means, and retarding means for controlling the time of closing of said switch in relation to the opening of the shutter leaves, means operatively connected to both said retarding means for simultaneously adjusting both said retarding means, and means separately adjustable to selectively connect or disconnect the second-named retarding means to and from said switch in accordance with the time delay characteristic of the type of flashlamp used on the camera.

10. A between-the-lens shutter for a photographic camera comprising a casing, a plurality of shutter leaves, means for opening and closing the shutter leaves, adjustable retarding means operatively connected to said opening and closing means for controlling the length of time the shutter is open, a photoflash synchronizer mechanism including a switch arranged to be closed by a part of said opening and closing means, and retarding means for controlling the time of closing of said switch in relation to the opening of the shutter leaves, a movable cam member operatively connected with both said retarding means for simultaneously adjusting both said retarding means, and means separately adjustable to selectively connect or disconnect the second-named retarding means to and from said switch in accordance with the time delay characteristic of the type of flashlamp used on the camera.

11. A between-the-lens shutter for a photographic camera comprising a casing, a plurality of shutter leaves movably mounted in said casing, a toothed, spring-actuated, rotatable master member for opening and closing said shutter leaves, a detent lever pivotally mounted in said casing and having an electrical contact member secured thereto, a pin on said lever adapted to engage a tooth of the master member to hold the master member against rotation, a trigger movably mounted in the casing and operable to disengage the detent lever, a stationary electrical contact with which said first-named contact is adapted to engage to close a circuit to a photoflash lamp, and means synchronizing the flash with opening of the shutter leaves comprising a train of gearing terminating in an escapement, an actuating member on the first gear of said train which is adapted to be positioned for actuation by said detent lever when the lever is released, and a ring rotatably adjustable in the casing about the axis of the master member and operatively connected to said train of gearing to adjust the position of said actuating member relative to said detent lever, and means separately adjustable to selectively position said actuating member in or out of position for actuation by said detent lever in accordance with the time delay characteristic of the type of flashlamp used on the camera.

12. In a photographic shutter of the setting type the combination with shutter blades, a blade-operating mechanism for controlling the opening and closing of said blades when moving from a cocked condition; a release mechanism for releasing said blade-operating mechanism from its cocked condition; a speed control member adapted to be selectively positioned to vary the speed of operation of a part of said blade-operating mechanism; a flash synchronizer mechanism comprising a pair of normally spaced switch contacts adapted to be connected into an electric circuit controlling the ignition of a flash lamp having a characteristic "lag"; means for connecting one of said switch contacts to said release mechanism to be moved into engagement with the second contact upon movement of said release mechanism to a shutter-releasing position and in timed relation with the release of said blade-operating mechanism thereby; of means for automatically altering the relative time of closing of said switch and the release of said blade-operating means by said release mechanism to accommodate for the "lag" of the flash lamp and the selected exposure speed, and including an operative connection between said speed control member and the synchronizer mechanism whereby the time of closing of said switch relative to the release of said blade-operating mechanism from a cocked condition is automatically adjusted by movement of said speed control member.

13. A between-the-lens shutter for photographic cameras comprising a casing, a plurality of shutter leaves movably mounted in said casing, a movable shutter-operating member for effecting opening and closing of said leaves upon movement of said member, a releasable detent for holding said shutter-operating member against movement, spring-actuated means for effecting movement of said member when it is released, a flash synchronizing mechanism comprising a pair of normally-spaced switch contacts adapted to be connected into an electrical circuit for igniting a flash lamp, one of said contacts being disposed to be moved into contact with the other upon release of said detent, means for adjustably retarding the movement of said member, after release of of said detent, to adjustably vary the time between the closing of said contacts and the opening of said shutter leaves, and means operatively connected to said member for retarding the opening of said shutter leaves until after said contacts have been closed.

14. A between-the-lens shutter for photographic cameras comprising a casing, a plurality of shutter leaves movably mounted in said casing, a movable shutter-operating member for effecting opening and closing of said leaves upon movement of said member, a releasable detent for holding said shutter-operating member against movement, spring-actuated means for effecting movement of said member when said member is released, a flash synchronizing mechanism comprising a pair of normally-spaced switch contacts adapted to be connected into an electrical circuit for igniting a flash lamp, one of said contacts being disposed to be moved into contact with the other upon release of said detent, means including a ring adjustable about the axis of the lens for adjustably retarding the movement of said member, after release of said detent, to adjustably vary the time between the closing of said contacts and the opening of said shutter leaves, and means operatively connected to said member for retarding the opening of said shutter leaves until after said contacts have been closed.

15. A between-the-lens shutter for photographic cameras comprising a casing, a plurality of shutter leaves movably mounted in said casing, a movable shutter-operating member for effecting opening and closing of said leaves upon movement of said member, a releasable detent for holding said shutter-operating member against movement, spring-actuated means for effecting movement of said member when said member is released, a flash synchronizing mechanism comprising a pair of normally-spaced switch contacts adapted to be connected into an electrical circuit for igniting a flash lamp, one of said contacts being disposed to be moved into contact with the other upon release of said detent, means for adjustably retarding the movement of said member, after release of said detent, to adjustably vary the time between the closing of said contacts and the opening of said shutter leaves, adjustable means for controlling the speed of operation of said shutter, and a single member operatively connected both to said retarding means and to said speed controlling means and adjustably mounted in said casing for adjusting simultaneously said retarding means and said speed controlling means.

16. A between-the-lens shutter for photographic cameras as claimed in claim 15 wherein said single member is a ring adjustable in said casing about the axis of the lens.

17. A between-the-lens shutter for photographic cameras comprising a casing, a plurality of eccentrics rotably mounted in said casing, a shutter leaf rotatably mounted on each eccentric, a guide member for each shutter leaf mounted in said casing, a pin secured to each shutter leaf and engaging the associated guide member so that rotation of an eccentric imparts ecentric rotary motion to the associated shutter leaf to open and close the same, a rotatable spring-actuated master member mounted in said casing concentric with the lens and geared to all said eccentrics to rotate said eccentrics on rotation of said master member, a releasable detent for holding said master member in cocked position, a flash-synchronizing mechanism comprising a pair of normally-spaced switch contacts adapted to be connected into an electrical circuit for igniting a flash lamp, one of said contacts being operatively connected to said detent and being disposed to move into contact with the other upon release of said detent, and means for adjustably retarding the movement of said master member after release of said detent to adjustably vary the time between the closing of said contacts and the opening of said shutter leaves.

18. A between-the-lens shutter for photographic cameras as claimed in claim 17 wherein said one contact is carried by said detent and said other contact is secured to said casing.

19. A between-the-lens shutter for photographic cameras as claimed in claim 17 wherein said retarding means comprises a first train of gearing mounted in said casing and terminating in an escapement, and the means for adjusting said retarding means comprises a ring adjustable in said casing about the common axis of said lens and master member.

20. A between-the-lens shutter for photographic cameras as claimed in claim 19 wherein means is also provided for controlling the speed of operation of said shutter, and said speed control means includes said ring.

21. A between-the-lens shutter for photographic cameras as claimed in claim 20 wherein said speed control means includes a second train of gearing terminating in an escapement, and said second train of gearing is carried by said ring.

22. In a photographic shutter the combination with shutter blades and a photo-flash circuit provided with a normally open switch, a shutter blade operating mechanism including a first angularly displaceable member, means for selectively displacing the first member at a given speed in a direction for closing said switch and subsequently operating the shutter blades, shutter release means for selectively initiating the displacement of said first member, a gear-retarding mechanism including a first gear rotationally driven by said first member for retarding the displacement of the first member subsequent to closing the switch thereby to selectively accommodate for the "lag" of the type photo-flash lamp to be used in said circuit and to synchronize the peak of maximum illumination of the photo-flash lamp with the maximum opening of the shutter blades, and a speed control member adapted to be selectively positioned to vary the speed of operation of the shutter blades and adapted to cooperate with said gear-retarding mechanism for angularly positioning said first gear whereby the first member is properly retarded regardless of the shutter operation speed determined by said speed control member.

23. In a photographic shutter the combination with shutter blades and a photoflash circuit provided with a normally open switch, a shutter blade operating mechanism including a first angularly displaceable member, means for selectively displacing said first member in a direction for closing said switch and subsequently operating the shutter blades to a full open position, means for selectively initiating the displacement of said first member, synchronizer means operated by said first member having means for adjustably retarding the displacement of the first member subsequent to closing the switch to accommodate for the "lag" of the type photoflash lamp to be used in said circuit and to synchronize the peak of maximum illumination of the photoflash lamp with the maximum opening of the shutter blades, and means to automatically synchronize the maximum opening of the shutter blades with the peak of maximum illumination of the type photoflash lamp being used in said circuit in accordance with any exposure time selected comprising a single shutter speed and exposure time control member cooperative with said synchronizer means and operable to a plurality of positions to select any vary the speed of operation of the shutter blades and to vary retardation of angular rotation of said first member subsequent to closing the switch and prior to operating the shutter blades to a full open position.

24. A between-the-lens shutter for photographic cameras comprising a casing, a plurality of movable shutter leaves, leaf-operating mechanism for opening and closing said shutter leaves, releasable means for holding said leaf-operating mechanism in cocked condition, a speed control member adapted to be selectively positioned to vary the speed of operation of said leaf-operating mechanism to control the length of time the shutter is open, a flash synchronizer mechanism comprising a pair of normally spaced switch contacts adapted to be connected into an electric circuit controlling the ignition of a flash lamp, means connected to said releasable means for moving one of said switch contacts into engagement with the other upon movement of said releasable means to released position, adjustable retarding means adapted to be selectively positioned to vary the lapsed time before engagement of said switch contacts after release of said releasable means, and means operatively connecting said speed control member to said retarding means, whereby the time of closing of said switch contacts relative to the opening of said shutter leaves is automatically adjusted by adjustment of said speed control member.

25. A between-the-lens shutter for photographic cameras as claimed in claim 24 wherein said speed control member is rotatably adjustable in said casing.

26. A between-the lens shutter for photographic cameras as claimed in claim 24, wherein there are two coaxial lenses positioned in said casing in axially-spaced relation, said shutter leaves are movably mounted in said casing between said two lenses, and said speed control member comprises a cam rotatably adjustable in said casing about the common axis of said lenses.

References Cited by the Examiner
UNITED STATES PATENTS

| | | | |
|---|---|---|---|
| 2,298,107 | 10/1942 | Carr | 95—11.5 |
| 2,429,972 | 11/1947 | Aiken. | |
| 2,435,161 | 1/1948 | Schwarz | 95—11.5 |
| 2,507,182 | 5/1950 | Young | 95—63 |
| 2,514,919 | 7/1950 | Willcox | 95—11.5 |
| 2,588,980 | 3/1952 | Hodges | 95—63 |
| 2,596,671 | 5/1952 | Fuerst | 95—11.5 |

JOHN M. HORAN, *Primary Examiner.*

J. E. GONSALVES, EMIL G. ANDERSON, D. B. LOWE, E. E. FULLER, *Examiners.*

W. D. ROBERSON, D. H. RUBIN, R. C. PINKHAM,
*Assistant Examiners.*